(12) United States Patent
Spicer et al.

(10) Patent No.: US 8,439,247 B1
(45) Date of Patent: May 14, 2013

(54) ULTRASONIC WELDING SYSTEM WITH DYNAMIC PRESSURE CONTROL

(75) Inventors: John Patrick Spicer, Plymouth, MI (US); Benjamin R. Christian, Novi, MI (US); Jeffrey A. Abell, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/289,530

(22) Filed: Nov. 4, 2011

(51) Int. Cl.
*B23K 20/00* (2006.01)
*B23K 20/10* (2006.01)

(52) U.S. Cl.
USPC ........ 228/1.1; 228/110.1; 228/111; 156/73.1; 156/590.1

(58) Field of Classification Search ............... 228/110.1, 228/1.1, 111; 156/73.1, 580.1
See application file for complete search history.

(56) References Cited

U.S. PATENT DOCUMENTS 6,202,915 B1* 3/2001 Sato ........................... 228/110.1
7,219,419 B2* 5/2007 Higashi et al. .................. 29/740

* cited by examiner

*Primary Examiner* — Erin Saad
(74) *Attorney, Agent, or Firm* — Quinn Law Group, PLLC

(57) ABSTRACT

An ultrasonic welding system for securing a first work piece to a second work piece includes a welding assembly and a loading assembly disposed adjacent to the welding assembly. The welding assembly includes an ultrasonic controller, an ultrasonic transducer, and a welding tip. The ultrasonic transducer is configured to impart an ultrasonic vibration to the welding tip in response to an electrical signal received from the ultrasonic controller. The loading assembly is configured to generate a pressure load between the welding tip and the first work piece, and includes a first actuator and a second actuator. The first actuator is configured to apply a substantially constant load to the welding assembly, and the second actuator is configured to apply a dynamically variable load to the welding assembly.

12 Claims, 2 Drawing Sheets

ULTRASONIC WELDING SYSTEM WITH DYNAMIC PRESSURE CONTROL

TECHNICAL FIELD

The present invention relates generally to an ultrasonic welding system with dynamic pressure control.

BACKGROUND

Ultrasonic welding is the process of fusing two work pieces together using ultrasonic acoustic vibrations. Ultrasonic welding can be used for both hard and soft plastics, such as semicrystalline plastics, and metals. Typically, the materials are sandwiched between a welding tip, also referred to as a sonotrode or horn, and an anvil. The welding tip imparts the ultrasonic vibrations to the work pieces, which locally melts or transforms the work pieces around the point of contact. This local material transformation is a result of the work pieces absorbing the vibration energy. The joint may be formed by either by fusion or covalent bonds in the case of dissimilar metals as a result of the input energy which includes the frequency and amplitude of the vibrations, the surface properties of the joining materials, and the pressure applied at the intended joint.

SUMMARY

An ultrasonic welding system for securing a first work piece to a second work piece includes a welding assembly and a loading assembly disposed adjacent to the welding assembly. The welding assembly may include an ultrasonic controller, an ultrasonic transducer, and a welding tip. The ultrasonic transducer may be configured to impart an ultrasonic vibration to the welding tip in response to an electrical signal received from the ultrasonic controller. The loading assembly may then be configured to generate a pressure load between the welding tip and the first work piece, and includes a first actuator and a second actuator. The first actuator is configured to apply a substantially constant load to the welding assembly, and the second actuator is configured to apply a dynamically variable load to the welding assembly.

In one configuration, the first actuator may be a pneumatic actuator, and the second actuator may be a piezoelectric actuator, which may be, for example, disposed in a series arrangement with the welding assembly. The loading assembly may further include a pressure controller, and the piezoelectric actuator may be configured to apply the dynamically variable load to the welding assembly in response to an electrical signal provided by the pressure controller. The pressure controller may be configured to provide this electrical signal to the piezoelectric actuator in response to an indication of the real-time power of the electrical signal provided to the ultrasonic transducer. In an embodiment, the pressure controller may be configured to vary the electrical signal provided to the piezoelectric actuator such that the power of the electrical signal provided to the ultrasonic transducer tracks a predefined power curve.

The ultrasonic controller may be configured to vary the power of the electrical signal provided to the ultrasonic transducer such that the ultrasonic transducer generates an ultrasonic vibration having a substantially constant frequency. The ultrasonic vibration may have a frequency within the range of about 5 kHz to about 100 kHz. Likewise, the electrical signal provided by the pressure controller may be updated at a rate greater than twice the frequency of the ultrasonic vibration.

Additionally, a method for performing an ultrasonic welding operation with dynamic weld pressure control may include actuating a first actuator to translate a welding tip of an ultrasonic welding assembly into contact with a work piece, and imparting a pressure load between the welding tip and the work piece. A fixed frequency ultrasonic vibration may then be generated in the welding tip by providing an ultrasound transducer coupled to the welding tip with an electrical signal having a measurable power. The real-time power of the electrical signal may be monitored, and a second actuator may be actuated in response to the monitored real-time power of the electrical signal. The actuation of the second actuator may be configured to vary the pressure load between the welding tip and the work piece.

The above features and advantages and other features and advantages of the present invention are readily apparent from the following detailed description of the best modes for carrying out the invention when taken in connection with the accompanying drawings.

DETAILED DESCRIPTION

Figure 1:
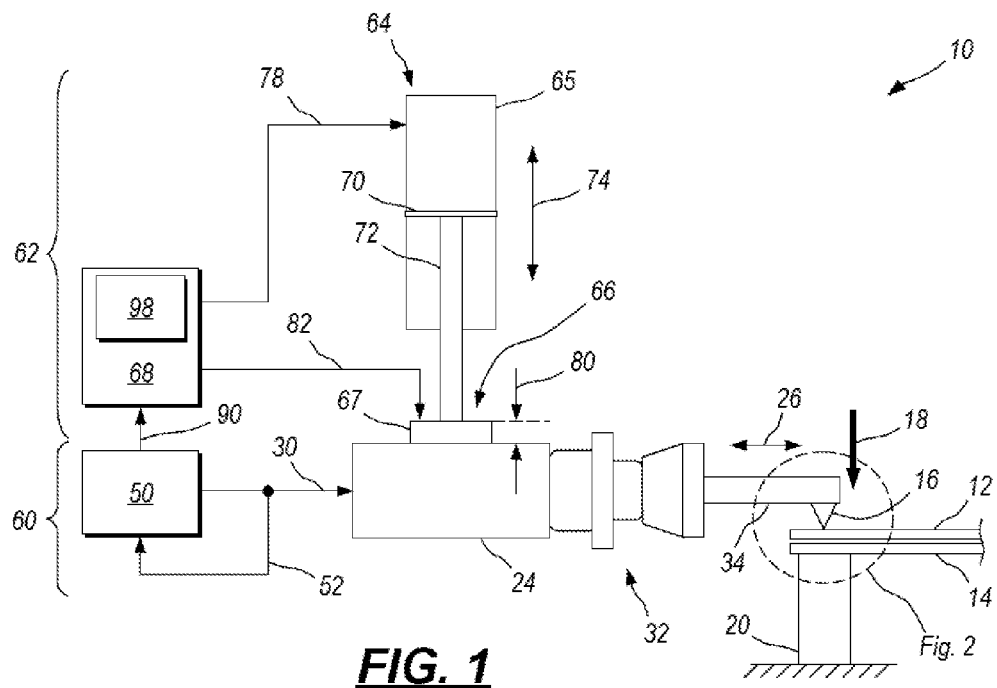
FIG. 1 is a schematic side view of an ultrasonic welding system including a welding assembly and a clamping assembly.

Referring to the drawings, wherein like reference numerals are used to identify like or identical components in the various views, FIG. 1 schematically illustrates an ultrasonic welding system 10 that is configured to weld a first work piece 12 to a second work piece 14 at an area proximate to an ultrasonic welding tip 16. In one configuration the work pieces 12, 14 may be generally thin gauge sheet metals. In other configurations, the work pieces 12, 14 may be plastic components or wires.

During a welding procedure, the welding tip 16 may apply a transverse pressure load 18 or normal force to the first work piece 12. In one configuration, the pressure load 18 may compress, or clamp the first work piece 12 against the second work piece 14. In other configurations, secondary clamping devices may be used to hold the work pieces 12, 14 in a temporarily rigid arrangement, relative to each other, while the weld is formed. An anvil 20 may be disposed on an opposite side of the work piece arrangement 12, 14 from the welding tip 16, and may restrain the applied pressure load 18 from bending, or otherwise deforming the work pieces 12, 14. Said another way, the work pieces 12, 14 may be sandwiched between the welding tip 16 and an anvil 20.

An ultrasound transducer 24 may impart a periodic, vibratory motion 26 to the welding tip 16 in a direction that is generally co-planar with the surface 28 of the first work piece 12. More particularly, the vibratory motion 26 may be a generally linear oscillation along the surface 28. The vibratory motion 26 may have a substantially constant periodic frequency that falls within the range of about 5 kHz to about 100 kHz. For example, in a particular example where the work pieces are metal, the frequency of the vibratory motion 26 may be about 20 kHz.

The ultrasound transducer 24 may include a piezoelectric material that generates the mechanical motion 26 in response to an electrical signal 30. In an embodiment, a mechanical amplifier 32 may be positioned in a series arrangement between the transducer 24 and the welding tip 16. The mechanical amplifier 32 may be specially configured to resonate at the set frequency of the ultrasound transducer 24 (or vice versa). By tuning the amplifier 32 to the frequency of the transducer 24, small motions generated by the transducer 24 may be enhanced in magnitude by the amplifier 32, which may be then transferred through, for example, a shank 34 to the welding tip 16.

While the welding tip 16 provided in FIG. 1 is shown as a wedge-like element, it is contemplated that many other welding tip designs may be used. For example, the welding tip 16 may include a contact surface or land that is generally configured to contact the first work piece 12 over an area. In such a configuration, the contact surface may have a roughened, friction-promoting surface texture, which may include a plurality of contact asperities and/or projecting wedges, cones, or pyramids (i.e., projecting features). During a welding procedure, the applied pressure load 18 may cause the projecting features of the welding tip 16 to impinge upon the surface 36 of first work piece 12, even if only on the molecular level.

Figure 2:
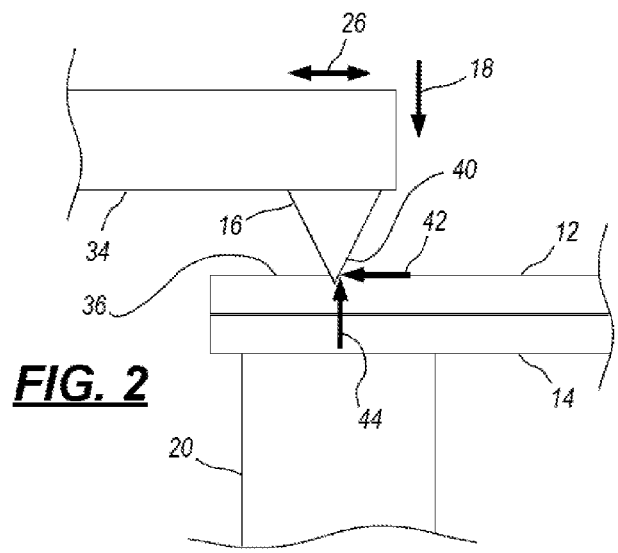
FIG. 2 is an enlargement of the area "Fig. 2," as provided in FIG. 1.

As generally illustrated in FIG. 2, during the induced vibratory motion 26 of the welding tip 16, a frictional force 42 may be created in a direction substantially parallel to the surface 36. Additionally, the angled contact surface 40 of the tip 16 may impart a lifting force 44 transverse to the surface 36 as a result of the motion 26. As may be appreciated, these forces 42, 44 may dynamically vary based on the instantaneous magnitude of the vibratory motion 26. The lifting force 44 may counteract the applied pressure load 18, which may correspondingly attenuate the frictional force 42 and/or energy imparted into the work piece 12.

In addition to dynamic changes in the frictional forces 42 due to the variable resultant contact pressure loading (i.e., the applied pressure load 18 minus any dynamic lifting forces 44), the frictional force 42 may vary due to changes in the material properties of the first work piece 12. For example, as the ultrasonically applied friction forces 42 locally heat the work piece 12, it may soften, which may alter the ability of the tip 16 to transfer ultrasonic energy into the work piece 12.

Referring again to FIG. 1, an ultrasonic controller 50 may be used to ensure that the frequency of the mechanical vibratory motion 26 remains constant when faced with a dynamically variable resistive force (i.e., friction forces 42). As discussed above, this constant frequency is required for at least the proper functioning of the mechanical amplifier 32. During operation, the ultrasonic controller 50 may attempt to output a constant frequency electrical signal 30 by modulating the power of the signal 30. This modulation may occur in a closed-loop manner, where the controller 50 constantly monitors the real-time frequency via a feedback loop 52. Then, the controller 50 may dynamically adjust the power of the electrical signal 30 to eliminate any deviation between the actual, sensed frequency and the desired frequency.

The ultrasonic controller 50 may be embodied as one or multiple digital computers or data processing devices, each having one or more microprocessors or central processing units (CPU), read only memory (ROM), random access memory (RAM), electrically-erasable programmable read only memory (EEPROM), a high-speed clock, analog-to-digital (A/D) circuitry, digital-to-analog (D/A) circuitry, input/output (I/O) circuitry, power electronics/transformers, and/or signal conditioning and buffering electronics. The individual control routines/systems resident in the ultrasonic controller 50 or readily accessible thereby may be stored in ROM or other suitable tangible memory location and/or memory device, and automatically executed by associated hardware components of the controller 50 to provide the respective control functionality.

The ultrasonic controller 50, ultrasonic transducer 24, mechanical amplifier 32, shank 34 and welding tip 16 may generally comprise the ultrasonic welding assembly 60. Adjacent the ultrasonic welding assembly 60 may be a loading assembly 62, which may be configured to generate and control the application of the transverse pressure load 18 between the welding tip 16 and the first work piece 12. As will be discussed, the loading assembly 62 may generally be configured to translate the welding tip 16 until a threshold contact is established between the tip 16 and the first work piece 12. It may then dynamically refine the applied pressure load 18 to account for variable lifting forces 44 and/or changing material conditions.

The loading assembly 62 may include a first actuator 64 and a second actuator 66 disposed in a series arrangement with the welding assembly 60. In one embodiment, the first actuator 64 may be configured for low frequency, high amplitude movement. Comparatively, the second actuator 66 may be configured for high frequency, low amplitude movement. In this configuration, the first actuator 64 may be used to move the welding tip 16 into contact with the first work piece 12 and to generate a steady state pressure load 18. The second actuator 66 may then be used to counteract dynamic/transient pressure load changes, which may be attributable to the ultrasonic vibrations 26, yet may be too quick for the first actuator 64 to compensate for. Said another way, the first actuator 64 may be configured for steady state translations of the welding assembly 60, while the second actuator 66 may be configured for high-speed, dynamic adjustments.

As illustrated in FIG. 1, for example, the first actuator 64 may be a pneumatic actuator 65 and the second actuator 66 may be a piezoelectric actuator 67. The pneumatic actuator 65 may include a movable piston 70 and a ram 72 that are configured to translate in a direction 74 substantially transverse to the first work piece 12. The pneumatic actuator 65 may extend upon receipt of an electric signal 78 from the pressure controller 68. Alternatively, other devices/switches may be used to actuate the pneumatic actuator 65. While not shown, the pneumatic actuator 65 may include any pressure reservoirs, pumps, valves, and/or control circuitry that may be needed to effectuate such actuation upon receipt of the electrical signal 78.

The piezoelectric actuator 67 may be disposed between the ram 72 and the welding assembly 60, and may be configured to expand and contract in a dimension 80 transverse to the work piece 12 in response to an electrical actuation signal 82 provided by the pressure controller 68. Piezoelectric actuators, such as the one illustrated, are generally capable of producing high-force, highly precise actuation responses, though only over short stroke lengths (e.g., less than 100 micrometers). Additionally, because the response time of piezoelectric actuators is extremely fast (e.g., capable of over 10 MHZ actuation), they may be suitable to dynamically adjust the applied pressure load 18 through the welding tip 16 multiple times within one ultrasonic cycle (e.g., the update speed of the pressure applied by the piezoelectric actuator 67 may be greater than twice the ultrasonic vibration frequency).

Figure 3:
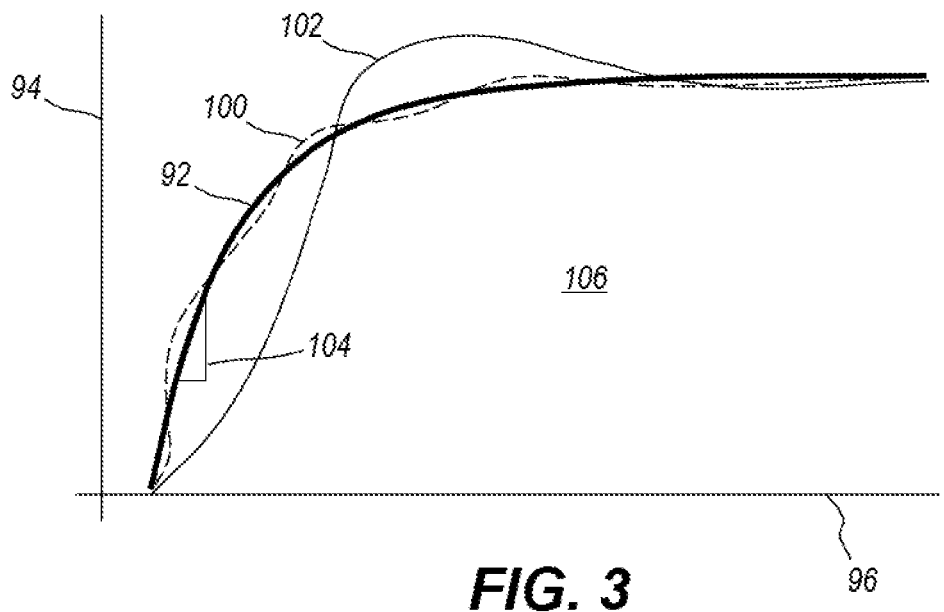
FIG. 3 is a graph of actual and desired weld power during an ultrasonic welding process.

The pressure controller 68 may dynamically modulate the applied pressure load 18 by controlling the actuation of the piezoelectric actuator 67 via the electrical actuation signal 82. In one embodiment, the pressure controller 68 may modulate the applied pressure load 18 in response to an indication of the power 90 of the electrical signal 30 provided to the ultrasonic transducer 24, which may be provided to the pressure controller 68 by the ultrasound controller 50. More specifically, the pressure controller 68 may modulate the applied pressure load 18, via the piezoelectric actuator 67 such that the power of the electrical signal 30 provided to the ultrasonic transducer 24 follows a pre-defined power trajectory 92, such as generally represented in FIG. 3 (with power represented on the vertical axis 94, and time represented on the horizontal axis 96). The pre-defined power trajectory 92 may be stored in a memory 98 associated with the pressure controller 68 (as shown in FIG. 1).

While the power of the electrical signal 30 provided to the ultrasonic transducer 24 is directly related to the power injected into the weld, as described above, it is separately controlled by the ultrasonic controller 50 to maintain a constant generated frequency. By adjusting the applied pressure load 18, however, the pressure controller 68 may effectively modulate the amount of power transferred into the work piece 12, thus indirectly affecting the power provided to the ultrasound transducer 24. This dynamic adjustment may be performed in a closed-loop manner by comparing the indication 90 of the current power of the signal 30 (provided by the ultrasonic controller) to the pre-defined trajectory 92. While conventional PID-type control loops may be used to dynamically control the response of the piezoelectric actuator 67, other more advanced predictive control methods may similarly be used to account for the high frequency dynamics.

The pressure controller 68 may be embodied as one or multiple digital computers or data processing devices, each having one or more microprocessors or central processing units (CPU), read only memory (ROM), random access memory (RAM), electrically-erasable programmable read only memory (EEPROM), a high-speed clock, analog-to-digital (A/D) circuitry, digital-to-analog (D/A) circuitry, input/output (I/O) circuitry, power electronics/transformers, and/or signal conditioning and buffering electronics. The individual control routines/systems resident in the pressure controller 68 or readily accessible thereby may be stored in ROM or other suitable tangible memory location and/or memory device, and automatically executed by associated hardware components of the controller 68 to provide the respective control functionality.

Referring to FIG. 3, by dynamically controlling the applied pressure load 18, the actual power 100 may more closely track the pre-defined power curve/trajectory 90 than in a similar configuration that does not employ dynamic pressure control (i.e., curve 102). This close adherence to the predefined curve 90 may provide for a more predictable weld, particularly since the quality of the weld is highly dependent on the rate of the initial power injection (i.e., the slope 104), and the total energy transferred to the work piece 12 (i.e., the area 106 under the power curve 90).

In other configurations, rather than tracking a pre-defined power curve/trajectory as shown with FIG. 3, the applied pressure load 18 may be dynamically controlled to follow a pre-defined force/pressure curve, such as by monitoring a load-cell or force sensor associated with the horn or anvil. Alternatively, in a third configuration, the actuation of the piezoelectric transducer 67 could be actuated to follow a pre-defined displacement curve, as measured by a displacement sensor such as a Linear Variable Differential Transformer (LVDT).

The dynamic control of the piezoelectric actuator 67 may further be configured to reduce the applied pressure load 18 in the event a fault or error condition is detected. For example, if the actual power 100 is not responding as expected, the pressure controller 68 may direct the piezoelectric actuator 67 to reduce the applied pressure load 18 to avoid damaging the work piece.

Figure 4:
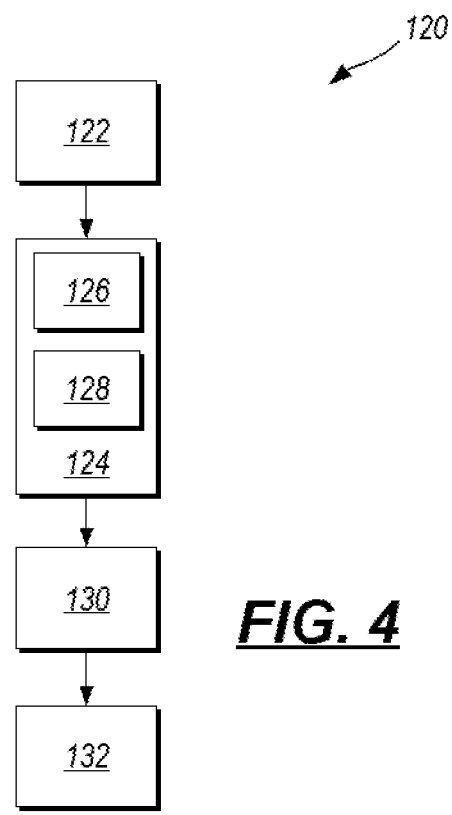
FIG. 4 is a schematic flow diagram of a method for performing an ultrasonic welding operation using dynamic pressure control.

FIG. 4 illustrates an exemplary method 120 for performing an ultrasonic welding operation with dynamic pressure control. As shown, the method 120 may begin by actuating the first actuator 64 to bring the welding tip 16 into contact with a first work piece 12 such that the tip 16 may apply an initial steady state pressure load 18 against the work piece 12 (step 122). The method 120 may then include generating a fixed frequency ultrasonic vibration 26 (step 124), such as by providing an ultrasound transducer 24 with an electrical signal 30 having a measurable power (step 126), and amplifying the output of the transducer 24 using a mechanical amplifier 32 (step 128). While the system 10 is generating the ultrasonic vibration 26, the method 120 may further include monitoring the real-time power of the electrical signal 30 (step 130), and actuating a second actuator 66 in a controlled manner to modulate the pressure load 18 between the welding tip 16 and the work piece 12 (step 132). The modulation of the pressure load 18 being operative to cause the real-time power 100 of the electrical signal 30 to track a pre-defined curve 90.

While the best modes for carrying out the invention have been described in detail, those familiar with the art to which this invention relates will recognize various alternative designs and embodiments for practicing the invention within the scope of the appended claims. It should be understood that the first actuator 64 can be any actuator capable of longer stroke lengths, such as pneumatic or hydraulic actuators, lead or ball screws, solenoids, etc. . . . Likewise, the second actuator 66 may be any actuator capable of a high-frequency response (i.e. more than twice the frequency of the ultrasonic vibration 26). It is intended that all matter contained in the above description or shown in the accompanying drawings shall be interpreted as illustrative only and not as limiting.

The invention claimed is:

1. An ultrasonic welding system for securing a first work piece to a second work piece, the system comprising:
   a welding assembly including an ultrasonic controller, an ultrasonic transducer, and a welding tip; the ultrasonic transducer configured to impart an ultrasonic vibration to the welding tip in response to an electrical signal received from the ultrasonic controller; and
   a loading assembly disposed adjacent to the welding assembly and configured to generate a pressure load between the welding tip and the first work piece, the loading assembly including a first actuator and a second actuator;
   wherein the first actuator is configured to apply a substantially constant load to the welding assembly; and
   wherein the second actuator is configured to apply a dynamically variable load to the welding assembly.

2. The ultrasonic welding system of claim 1, wherein the loading assembly further includes a pressure controller; and
   wherein the second actuator is configured to apply the dynamically variable load to the welding assembly in response to an electrical signal provided by the pressure controller.

3. The ultrasonic welding system of claim 2, wherein the pressure controller is configured to provide the electrical signal to the second actuator in response to an indication of a real-time power of the electrical signal provided to the ultrasonic transducer.

4. The ultrasonic welding system of claim 3, wherein the pressure controller is configured to vary the electrical signal provided to the second actuator such that the power of the electrical signal provided to the ultrasonic transducer tracks a pre-defined power curve.

5. The ultrasonic welding system of claim 4, wherein the ultrasonic controller is configured to vary the power of the electrical signal provided to the ultrasonic transducer such that the ultrasonic transducer generates an ultrasonic vibration having a substantially constant frequency.

6. The ultrasonic welding system of claim 2, wherein the ultrasonic vibration has a frequency within the range of about 5 kHz to about 100 kHz; and wherein the electrical signal provided by the pressure controller is updated at a rate greater than twice the frequency of the ultrasonic vibration.

7. The ultrasonic welding system of claim 1, wherein the first actuator and the second actuator are disposed in a series arrangement with the welding assembly.

8. The ultrasonic welding system of claim 1, wherein the first actuator is a pneumatic actuator, and wherein the second actuator is a piezoelectric actuator.

9. An ultrasonic welding system for securing a first work piece to a second work piece, the system comprising:
 a welding assembly including an ultrasonic controller, an ultrasonic transducer, and a welding tip; the ultrasonic transducer configured to impart an ultrasonic vibration to the welding tip in response to an electrical signal provided by the ultrasonic controller; and
 a loading assembly disposed adjacent to the welding assembly and configured to generate a pressure load between the welding tip and the first work piece, the loading assembly including a pneumatic actuator and a piezoelectric actuator, and a pressure controller in electrical communication with the piezoelectric actuator; and
 wherein the pneumatic actuator is configured to apply a substantially constant load to the welding assembly; and
 wherein the piezoelectric actuator is configured to apply a dynamically variable load to the welding assembly in response to an electrical actuation signal provided by the pressure controller.

10. The ultrasonic welding system of claim 9, wherein the electrical signal provided by the ultrasonic controller has a measurable power; and
 wherein the pressure controller is configured to provide the electrical actuation signal to the second actuator in response to an indication of the power of the electrical signal provided by the ultrasonic controller.

11. The ultrasonic welding system of claim 10, wherein the ultrasonic vibration has a frequency within the range of about 5 kHz to about 100 kHz; and wherein the electrical actuation signal provided by the pressure controller is updated at a rate greater than twice the frequency of the ultrasonic vibration.

12. The ultrasonic welding system of claim 11, wherein the electrical actuation signal provided by the pressure controller is varied to minimize the deviation between indication of the power of the electrical signal provided by the ultrasonic controller and a pre-defined power curve.

* * * * *